Feb. 22, 1938.     W. S. WRIGHT     2,109,096
AUTOMATIC CLUTCH RELEASE
Filed Feb. 4, 1932     2 Sheets-Sheet 1

Inventor
W. S. Wright
By C. A. Snow & Co.
Attorneys.

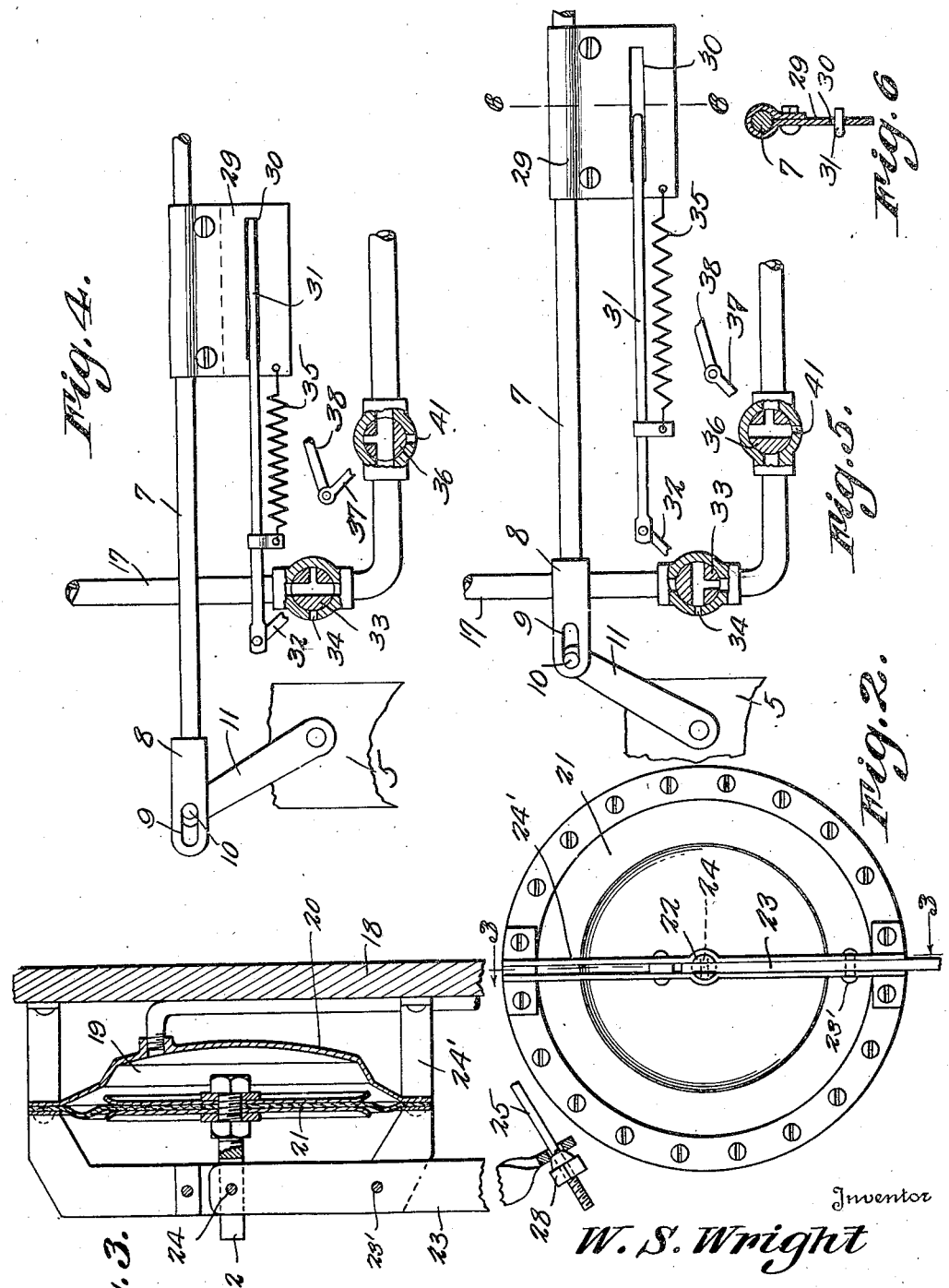

Patented Feb. 22, 1938

2,109,096

UNITED STATES PATENT OFFICE 2,109,096

AUTOMATIC CLUTCH RELEASE

William S. Wright, Newark, Ohio, assignor to Bendix Products Corporation, South Bend, Ind., a corporation of Indiana Application February 4, 1932, Serial No. 590,945

5 Claims. (Cl. 192—.01)

This invention relates to an automatic clutch control device, the primary object of the invention being to provide means for automatically operating the clutch to hold the clutch released, when the accelerator is in retracted position.

An important object of the invention is the provision of a device of this character so constructed that it may be readily and easily installed on motor vehicles, eliminating the necessity of making extensive alterations in the usual motor vehicle construction.

Another object of the invention is to provide means whereby the suction of the engine may be utilized for operating the clutch, thereby relieving the operator of the exertion and strain incident to the shifting of gears in starting or stopping a motor vehicle.

Still another object of the invention is to provide a device of the character described herein which is free from climatic conditions in that its principal operating elements cannot be affected by cold or freezing temperatures.

A still further object of the invention is the provision of means whereby the controlling mechanism may be manually operated to the end that the clutch may be operated by the device, in starting the vehicle.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 2 is a front elevational view of the diaphragm forming a part of the control mechanism, Figure 3 is a sectional view taken on line 3—3 of Figure 2.

Figure 4 is a view illustrating the normal positions of the valves and throttle rod when the device is in operation.

Figure 5 is a view illustrating the positions of the valves and throttle rod, while the device is shut off and not in operation.

Figure 6 is a sectional view taken on line 6—6 of Figure 5.

Figure 1:
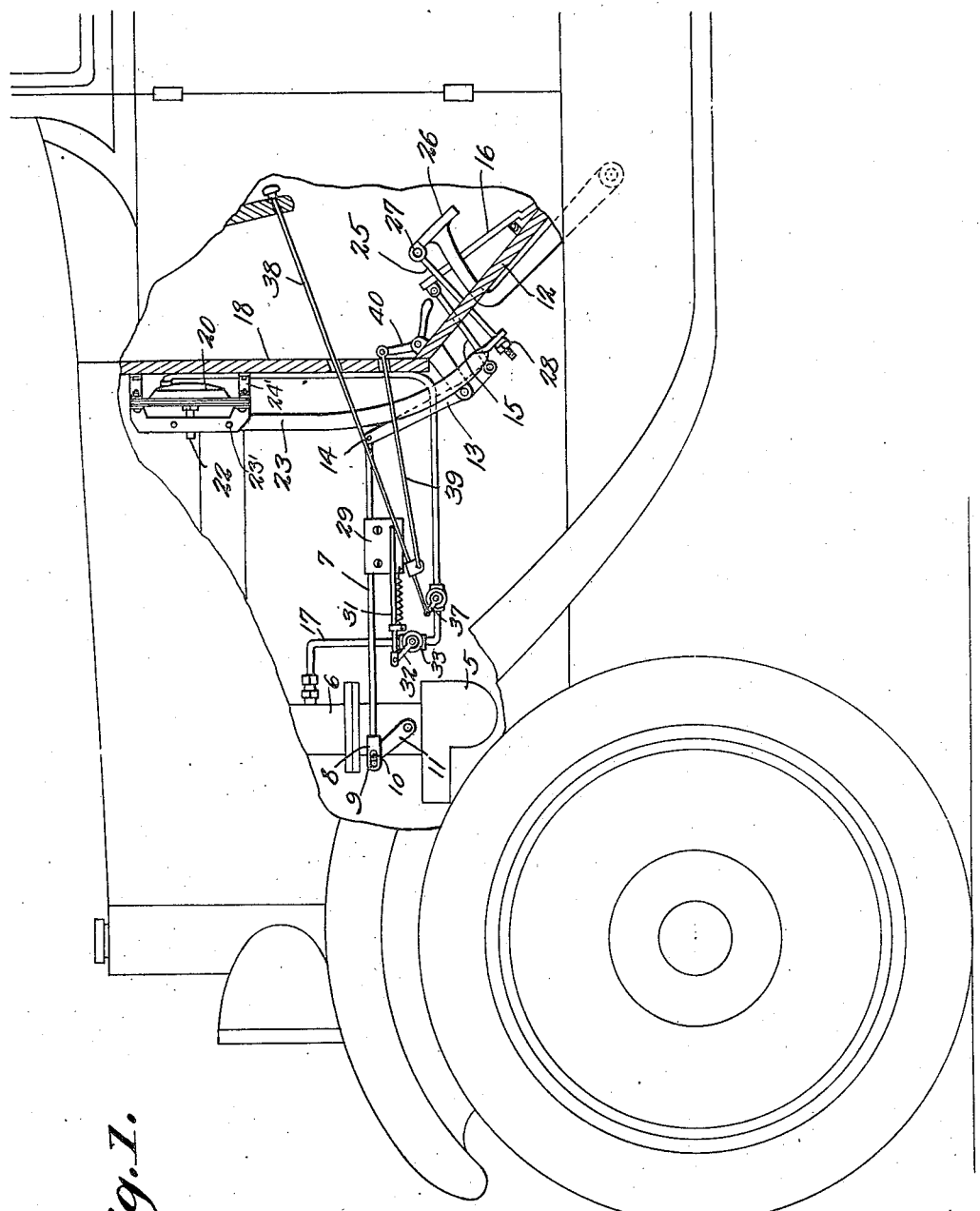
Figure 1 is an elevational view of a control device constructed in accordance with the invention, and illustrating the device as installed on a motor vehicle.

Referring to the drawings in detail, the reference character 5 designates the carburetor forming a part of a motor vehicle construction.

The usual intake manifold 6 connects with the carburetor 5, and is supplied with the usual throttle which is controlled by the throttle rod 7 or accelerator. This throttle rod 7 is formed with a head 8 which may have an elongated opening 9 into which the pin 10 of the throttle arm 11 extends, permitting of slight lost motion between the throttle rod 7 and throttle arm 11. The slot or elongated opening 9 may be of various lengths or eliminated entirely so that there may be no lost motion in order to compensate for the various degrees of openings of different clutches or for the different sizes of pipe used between the manifold and the clutch motor element.

Supported under the floor board 12 of the vehicle, is a pivoted arm 13, that connects with the throttle rod 7 at 14, the opposite end of the arm 13 being connected with the accelerator pedal 16, with the result that movement of the accelerator pedal will result in a relative movement of the arm 13, rod 7, and throttle arm, to control the speed of the motor.

The reference character 17 designates a pipe that connects with the intake manifold 6 at a point directly above the carburetor 5, and as shown, this pipe extends rearwardly where it is secured to the dash board 18 of the vehicle, one end of the pipe being in communication with the compartment 19 of the diaphragm housing 20.

The diaphragm, which is indicated by the reference character 21, closes one side of the housing, and, as shown, is provided with a pin 22 that has pivotal connection with the arm 23, at 24, so that movement of the diaphragm 21 will result in a relative movement of the arm 23, for purposes to be hereinafter more fully described.

A supporting bracket 24' connects with the dashboard 18 of the vehicle, and provides a support for the diaphragm housing and diaphragm, forming a part thereof.

The lower end of the arm 23 curves inwardly where it is provided with an opening through which the rod 25 extends, the rod having pivotal connection with the clutch pedal 26, at 27.

It is understood that the clutch pedal 26, or operating member, is connected to the clutch, not shown in the drawings, by a shaft and operating mechanism so that any movement of the clutch pedal, or operating member, will transmit movement to open or close the clutch.

The arm 23 is pivotally mounted on the bracket

24' at 23', so that the arm may work freely thereon.

A nut, indicated at 26, is positioned on one end of the rod 25, and affords means for adjusting the rod 25 with respect to the arm 23.

Thus it will be seen that, due to this construction, the clutch pedal may be operated without transmitting movement to the arm 23, it being understood that the rod 25 will move through the opening in the arm 23.

Secured to the throttle rod 7 to move therewith, is a plate 29 that depends from the rod, and, as shown, this plate 29 is provided with an elongated opening 30, into which one end of the rod 31 extends. This rod 31 extends forwardly where it connects with the valve arm 32 of the three way valve 33 so that when the rod 31 is operated, the valve 33 will operate to either establish communication between the intake manifold 6 and compartment 19 of the diaphragm housing, to operate the diaphragm 21, or, moved to a position as shown by Figure 5, where the communication is cut off, and the vacuum in the pipe and diaphragm housing is relieved by the air passing into the pipe through the opening 34.

A coiled spring indicated at 35 connects with the plate 29 and rod 31, so that the spring 35 normally acts to urge the valve to a position as shown by Figure 5 of the drawings.

As the accelerator rod 7 is moved to open the throttle, the rod 31 will be moved simultaneously by reason of the spring connection 35 to close the valve 33, due to lost motion in the slot 9, the throttle arm 11 will not move to open until the valve 33 is closed or partially closed, thereby permitting the clutch to move to its active position before the engine is speeded.

When the accelerator rod moves in the opposite direction to retard the speed of the engine, the throttle is closed in advance of the valve 33, which does not move until the end of the slot engages the end of the rod 31 that extends through the slot.

A three way valve 36 is also disposed in the pipe line 17, the arm 37 thereof being pivotally connected with the control rod 38 that extends through the instrument board in easy access to the operator of the vehicle.

Connected with the rod 38, is a rod 39 which has pivotal connection with the pedal 40, to the end that by operating either the pedal 40 or pulling the rod 38, the automatic clutch control device may be thrown out of operation at will.

This valve 36 is formed with a lateral opening 41 to allow air to enter the pipe between the valve 36 and diaphragm housing, to dissipate the vacuum therein.

The three-way valve 36, acts as a control valve for manual operation, and is shown in Figure 5 as in its venting position, relieving the vacuum in the diaphragm compartment 19 of the diaphragm housing 20, and permitting the clutch to move to its active or clutched position regardless of the position of the valve 33. The use of the valve 36 is exceptionally important, since the operator of a vehicle equipped with a three-way valve of this character, may have complete control of the vehicle at all times, and may utilize the operation of the pistons working in their cylinders, in braking the vehicle, when moving downgrade.

In the operation of the device, assuming that the motor is idling, it will be seen that a vacuum is created in the diaphragm housing, moving the diaphragm 21 inwardly, causing the arm 23 to move the clutch pedal and clutch connected therewith, to its retracted or inoperative position.

As the throttle rod is moved to increase the speed of the motor, the valve 33 is turned to a position as shown by Figure 5, whereupon the connection between the diaphragm and the manifold is closed and air is admitted to the diaphragm, which releases the tension on the arm 23, and the clutch springs thereupon close the clutch to its operative position, and move the arm 23 and the diaphragm to their original positions.

It follows that when pressure on the accelerator pedal is relieved, the valve 33 moves to a position as shown by Figure 4 causing a suction to be created in the pipe 17, which operates the diaphragm to move the clutch to its inoperative or retracted position, allowing the motor vehicle to glide along under its own momentum, commonly known as free wheeling.

As before stated, the control valve 36 must be moved to a position as shown by Figure 4 in order for the device to operate automatically, and that by moving the valve 36 to the position as shown by Figure 5 the automatic clutch operating mechanism may be thrown out of use.

Having thus described the invention what is claimed:

1. The combination in an automobile engine having an intake manifold, an accelerator controlled throttle valve connected to said manifold, and a clutch operating member, of a clutch control means comprising a flexible diaphragm open to the atmosphere on one side and closed to the atmosphere on the opposite side and connected to the clutch operating member, a pipe connecting the closed side of the diaphragm to the manifold, two valves located in the pipe and adapted to control said clutch control means, one of said valves being actuated by the accelerator to establish communication between the manifold and the closed side of the diaphragm when the accelerator is in retracted position, and to close this communication and establish open communication between the closed side of the diaphragm and the atmosphere when the accelerator is advanced, the other valve being manually operated to open communication through said pipe when in one position and to close this communication and open communication between the atmosphere and the closed side of the diaphragm when in another position, means for actuating the valve, which is operated by the accelerator in advance of the opening of the throttle valve, and for closing the throttle valve in advance of the actuation of this valve.

2. The combination in an automobile engine having an intake manifold, an accelerator controlled throttle valve and a clutch operating member, of a clutch control means operated by the suction within the intake manifold and connected to said clutch operating member, a pipe connecting the intake manifold with the clutch control means to subject such means to the suction in the manifold, two valves located in said pipe, one of said valves being actuated by the accelerator to open communication through said pipe when in one position, and to close this communication and vent the portion of said pipe to the atmosphere which is between the valve and the clutch control means when in another position, the other valve being manually controlled but performing the same function, and means for actuating the valve which is operated by the accelerator in advance of the opening of the throttle valve and for closing the throttle valve in advance of the actuation of this valve.

3. The combination in an automobile engine having an intake manifold, an accelerator operated throttle valve, a clutch operating member, a pneumatic motor connected to said clutch operating member, a pipe connecting the intake manifold with the pneumatic motor to subject said motor to the action of the vacuum within the intake manifold, a valve in said pipe also operated by the accelerator for control of the pneumatic motor, means for operating this valve in advance of the opening of the throttle valve, and means for closing the throttle valve in advance of the opening of this valve.

4. Clutch control mechanism for an automotive vehicle provided with a throttle and an accelerator, said mechanism comprising a control valve, and linkage interconnecting said valve, throttle and accelerator, said linkage including a link interconnecting the throttle and accelerator, and a second link interconnecting the valve and aforementioned link, the connection between said links including a spring and a lost motion means.

5. In an automotive vehicle provided with a clutch pedal and a dashboard, the latter comprising a part of the driver's compartment, power means for operating the clutch, said means including a diaphragm motor vertically mounted on the outside of said dashboard, a curved lever member connected at one of its ends with said clutch pedal, and a connecting rod interconnecting the other end of said lever member with the diaphragm of said motor.

WILLIAM S. WRIGHT.